United States Patent

Tavano, Sr.

[15] 3,656,792
[45] Apr. 18, 1972

[54] SAFETY CONSTRUCTION FOR VEHICLES

[72] Inventor: Joseph V. Tavano, Sr., 26 Whitney Street, Milford, Mass. 01757

[22] Filed: July 16, 1970

[21] Appl. No.: 55,509

[52] U.S. Cl..................................293/85, 293/88, 293/89, 267/140
[51] Int. Cl.......................................................B60r 19/08
[58] Field of Search ..................293/85, 86, 88, 99; 267/140, 267/141, 153, 57.1

[56] References Cited

UNITED STATES PATENTS

| | | | |
|---|---|---|---|
| 1,855,253 | 4/1932 | Moore et al. | 293/85 |
| 2,404,931 | 7/1946 | Somervell | 293/86 |
| 1,636,248 | 7/1927 | Schuette | 293/86 |
| 2,841,232 | 7/1958 | Loeffler | 180/89 |
| 2,788,998 | 4/1957 | Wilfert | 293/62 |
| 2,705,118 | 3/1955 | Beck | 248/10 |

FOREIGN PATENTS OR APPLICATIONS

| | | | |
|---|---|---|---|
| 213,611 | 6/1924 | Great Britain | 293/99 |
| 1,107,344 | 12/1955 | France | 293/85 |

Primary Examiner—Arthur L. La Point
Assistant Examiner—Robert Saifer
Attorney—Charles R. Fay

[57] ABSTRACT

Safety construction for vehicles particularly adapted to absorb and dissipate kinetic energy resulting from a crash whether head-on, from the rear, or at an angle with respect to the front and rear bumpers thereof comprising a bumper for attachment to the frame of a vehicle, a piston rod, a ball on the rod, a first shock pad on the bumper, a socket on the first shock pad receiving the ball, a cylinder open at one end facing the first shock pad and the piston rod, the cylinder having a closed bottom at its end opposite its open end, a spring in the cylinder, a piston fixedly mounted on the piston rod in the cylinder, the spring urging the piston toward the open end of the cylinder, a second shock pad mounting the cylinder including a shield surrounding the cylinder in spaced relation thereto, an elastomeric sleeve connecting the sleeve and the cylinder, and a mount for connecting shield to the vehicle frame.

2 Claims, 2 Drawing Figures

INVENTOR.
JOSEPH V. TAVANO, SR.
BY
Charles R. Fay, atty.

SAFETY CONSTRUCTION FOR VEHICLES

BACKGROUND OF THE INVENTION

Specific attention is directed to my prior patent U.S. Pat. No. 3,333,880 dated Aug. 1, 1967 and my co-pending application Ser. No. 842,896 filed July 18, 1969 and now abandoned.

These patents describe the problems involved in safety construction for vehicles and also they indicate solutions therefor. The present invention however provides for a better absorbtion and dissipation of kinetic energy at the instant of impact whether or not the impact is on an axial line with respect to the vehicle, or offset therefrom, or at an angle thereto.

This invention provides the ultimate in kinetic energy absorption.

SUMMARY OF THE INVENTION

In the present case there are provided flexible, resilient, shock absorbing connections between the frame of the vehicle and bumpers, absorbing the shock of collision under impact regardless of the direction of the impact, i.e., dead ahead, offset from the center of the vehicle or bumper, or at an angle with respect thereto; and the invention herein resides in these kinetic energy absorbing devices.

PREFERRED EMBODIMENT OF THE INVENTION

Figure 1:
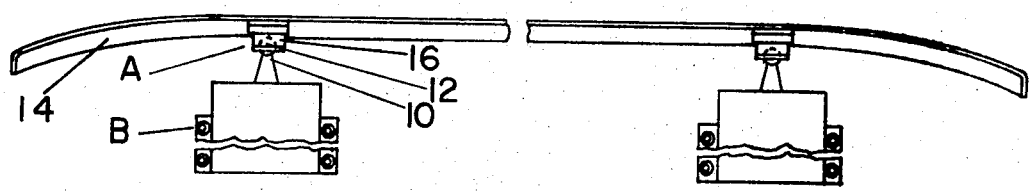
FIG. 1 is a diagrammatic illustration showing one proposed location for the devices.

FIG. 1 is a diagrammatic representation showing the kinetic energy absorbing devices secured to a bumper 14. There are two parts to each device as at A, connected to the bumper and B mounted on the vehicle frame. There are as many of these as desired, and the two parts of each device are connected by rod 10.

Figure 2:
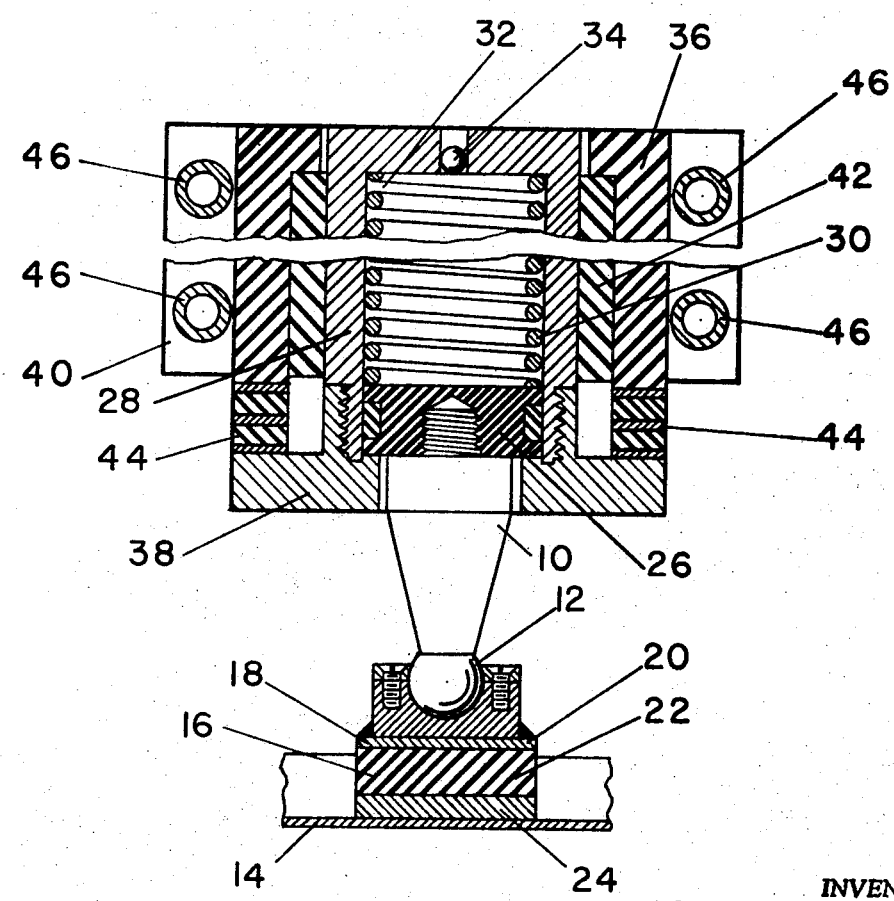
FIG. 2 is a sectional view illustrating the resilient shock absorbing joint located between the vehicle frame and the bumper.

Referring now to FIG. 2 there is shown the rod 10 having an end provided with a spherical ball or the like 12. It will be noticed that ball 12 has a greater diameter than the rod 10 and is attached by part A (to be described) to the bumper at 14 of the vehicle. This bumper may be of any construction.

The ball 12 is located in a thrust block of suitable material generally indicated at 16 and is held therein by a retaining cover plate or the like 18 secured in any desired way. Secured to the thrust block 16 is a rear plate 20 to which in turn is secured a resilient shock pad of elastic or elastometric material as at 22 and this is encased as for instance by forward plate 24 connected to the bumper.

Any means may be used for connecting these parts together but essentially the thrust block 16 is for instance welded with respect to the rear plate 20 of the resilient shock pad assembly in general and the shock pad 22 may be molded to its rear plate 20 and front plate 24. The bumper 14 may be secured to the resilient shock pad assembly by any means desired such as bolts or the like.

It is to be understood that the rod 10 extends from its resilient shock pad part A on the front bumper to a shock pad part B on the vehicle frame, and it acts as a piston rod for a piston 26 in an oil cylinder 28.

The cylinder has located therein a spring 30 and oil or other similar fluid material 32 which leads to an accumulator or reservoir through a pipe 34. This pipe is not as shown but extends from the front end of the cylinder 28 towards the accumulator or reservoir also not shown. The piston 26 has seals as shown so that any angled blow, or twist action will not break it.

A strong container or shield 36 has molded thereto an elastomeric shock pad 42 in the form of a sleeve also connected to the cylinder 28 at the exterior of the latter. The cylinder 28 is threaded to a base plate 38 and a shock pad of elastometric material 44 connects the plate 38 to the cylinder as shown.

Flanges 40 have bolt holes surrounded by shock sleeves 46 for the reception of bolts to the frame of the vehicle.

It will be clear that the kinetic energy absorbing device is principally the spring and the fluid in the cylinder and when an impact occurs at the bumper 14 energy is absorbed as the piston 26 relatively moves within its cylinder. It has been found that this arrangement performs satisfactorily through an adequate range of vehicle impact velocities and directions, with the highest efficiency, while still being compatible with the normal construction of vehicles without degrading the operating characteristics thereof including convenience and comfort of the passengers.

The novel construction here shown acts as stated whether the blow is axial relative to the rod 10, offset therefrom, or at an angle thereto, and this is due to the ball 12, the shock pads at 42, 44, and 46, and the seals for the piston 26, all acting in concert.

I claim:

1. A kinetic shock absorbing device for vehicles having a vehicle frame comprising a bumper, a piston rod, a ball on the rod, a first shock pad on the bumper, a socket on the first shock pad receiving the ball, a cylinder, open at one end facing the first shock pad and the piston rod, said cylinder having a closed bottom at its end opposite the open end thereof, a spring in the cylinder, a piston fixedly mounted on the piston rod in the cylinder, the spring urging the piston toward the open end of the cylinder, a second shock pad mounting the cylinder, said second shock pad comprising a shield surrounding the cylinder in spaced relation thereto, an elastomeric sleeve connecting the shield and the cylinder, and means on the shield for connection to the vehicle frame, a plate secured to said cylinder exteriorly thereof and at the open end thereof, and a third shock pad of annular form located between said plate and said shield.

2. The shock absorbing device of claim 1 including fluid in the cylinder, and port means through said cylinder for fluid exchange between the interior of said cylinder and an exterior accumulator.

* * * * *